UNITED STATES PATENT OFFICE.

RHETHERFORD B. MARTIN, OF NEW YORK, N. Y., ASSIGNOR TO MINERALS SEPARATION NORTH AMERICAN CORPORATION, OF NEW YORK, N. Y., A CORPORATION OF MARYLAND.

ORE CONCENTRATION.

1,236,857.  Specification of Letters Patent.  Patented Aug. 14, 1917.

No Drawing.  Application filed January 28, 1916. Serial No. 74,922.

*To all whom it may concern:*

Be it known that I, RHETHERFORD B. MARTIN, a citizen of the United States, residing at the borough of Manhattan, in the county of New York and State of New York, have invented certain new and useful Improvements in Ore Concentration, of which the following is a specification.

This invention consists in improvements in processes of ore concentration and has particular reference to the concentration of ores by flotation. In these processes the powdered ore is usually mixed with water, such mixture being termed the pulp, and to this pulp is added the frothing agent, consisting of an oil or oils or a soluble frothing agent or agents, or both, and the pulp is then subjected to agitation and aeration, for example, supro-aeration by air introduced from above by a suitable agitation of the pulp, or subaeration by air introduced from below through a porous medium or otherwise, as well known in the art, the result of this aeration and agitation being that the air bubbles coursing through the pulp gather up the metalliferous particles and carry them to the surface where they form a froth. This froth may be readily floated over a lip or dam and will thus carry the metalliferous particles away from the body of the liquid. My present invention relates to the frothing agents to be used in such processes. I have found that if a frothing agent consisting of or containing an oil is prepared for use in such process by heating it in the presence of sulfur, its effectiveness is very greatly increased so that, for example, when used in smaller proportions than are required of the raw frothing agent, it produces improved results.

The frothing agent may be treated in an autoclave or in a vessel connected with a reflux condenser or in an ordinary still. An autoclave may be used where the material treated is very volatile and has to be heated to a temperature above its normal boiling point to obtain the desired modification. A reflux condenser may be used where it is desired to mingle the distillate with the undistilled material while under treatment. When an ordinary still is used, the mixture is boiled and allowed to distil until the volatile constituents have passed over, leaving only a tarry residue which may be rejected or added to a new charge.

The proportion of sulfur to frothing agent is capable of wide variation, but since the tarry residue varies as the proportion of sulfur, it is preferable to use small quantities of sulfur. Usually a proportion of about 5 parts by weight of sulfur to 100 parts by weight of the frothing agent is sufficient for the purpose.

The materials that have been successfully treated with sulfur in this manner are pine oils, pine tars, turpentines, rosin oils, coal tar oils and creosotes, petroleum distillates and mixtures of these oils.

The following are examples of methods of modifying oils in accordance with my invention.

Example 1: A pine oil having a specific gravity of 1.03 was distilled in an ordinary still after mixing with 5 grams of sulfur to 100 cubic centimeters of oil. The distillation temperature ranged from 88° to 350° C., the bulk distilling between 200° and 350° C. The distillate formed a frothing agent with enhanced air-emulsification properties.

Example 2: The same oil was digested with sulfur in the same proportions for thirty minutes at a temperature of 250° C. in an open vessel fitted with a reflux condenser, with the result that the condensable distillates were returned to the mixture during the treatment. The resulting oil, somewhat darkened in color, had a specific gravity of 1.06 and formed a frothing agent with enhanced air-emulsification properties.

Modified oil produced according to either of the above examples appears to maintain its modified condition and can be made in quantities and stored and transported to the place of use and apparently will keep for an indefinite period.

As an example of the use of oil thus modified, I have found that for the treatment of a porphyry copper ore containing 2.5% of copper as sulfids, 2.06 pounds per ton of the raw oil used in the above examples was required for satisfactory treatment, whereas after this oil had been modified according to Example 2, 0.82 pounds per ton yielded with the same ore richer concentrates and cleaner tailings.

In the application of this invention to various ores and with the use of various oils and under various conditions, the examples of the process above described may be modified without departing from this invention.

I claim:

1. A process of concentrating ores which consists in agitating and aerating an ore pulp with a frothing agent which has been modified by heating it with sulfur so as by such agitation and aeration to obtain a froth of concentrates.

2. A process of concentrating ores containing copper which consists in agitating and aerating a pulp of such an ore with a frothing agent which has been modified by heating it with sulfur so as by such agitation and aeration to obtain a froth of concentrates.

3. A process of concentrating ores which consists in agitating an aerating an ore pulp with a frothing agent comprising an oil which has been modified by heating it with sulfur so as by such agitation and aeration to obtain a froth of concentrates.

4. A process of concentrating ores containing copper which consists in agitating and aerating a pulp of such an ore with a frothing agent comprising an oil which has been modified by heating it with sulfur so as by such agitation and aeration to obtain a froth of concentrates.

5. A process of concentrating ores which consists in agitating and aerating an ore pulp with a frothing agent comprising an oil which has been modified by heating it with sulfur to a temperature in the neighborhood of 250° centigrade, and returning condensable distillates to the mixture during the treatment, so as by such agitation and aeration to obtain a froth of concentrates.

6. A process of concentrating ores containing copper which consists in agitating and aerating a pulp of such an ore with a frothing agent comprising an oil which has been modified by heating it with sulfur to a temperature in the neighborhood of 250° centigrade, and returning condensable distillates to the mixture during the treatment, so as by such agitation and aeration to obtain a froth of concentrates.

In testimony whereof I have affixed my signature in presence of two witnesses.

RHETHERFORD B. MARTIN.

Witnesses:
 HENRY D. WILLIAMS,
 HARRY C. LEWIS.